United States Patent [19]

Sweeney, III

[11] Patent Number: 5,336,147
[45] Date of Patent: Aug. 9, 1994

[54] EXERCISE MACHINE

[76] Inventor: Edward C. Sweeney, III, 100 Kendall Rd., Keene, N.H. 03431

[21] Appl. No.: 160,743

[22] Filed: Dec. 3, 1993

[51] Int. Cl.$^5$ .................... A63B 21/00; G05G 1/14
[52] U.S. Cl. ........................ 482/57; 482/62; 74/594.1; 74/600
[58] Field of Search ............ 482/57, 58, 60, 62, 482/63, 908; 74/586, 594.1, 594.3, 600

[56] References Cited

U.S. PATENT DOCUMENTS

| D. 191,792 | 11/1961 | Maratta . | |
|---|---|---|---|
| D. 305,347 | 1/1990 | Wittenbrock et al. . | |
| 654,560 | 7/1900 | Andziewics | 74/594.1 |
| 3,213,852 | 10/1965 | Zant . | |
| 3,964,742 | 6/1976 | Carnielli . | |
| 4,402,502 | 9/1983 | Peters . | |
| 4,423,863 | 1/1984 | Figueroa . | |
| 4,842,269 | 6/1989 | Huang . | |
| 4,850,245 | 7/1989 | Feamster et al. | 74/600 |
| 4,915,374 | 4/1990 | Watkins | 482/57 |
| 4,961,569 | 10/1990 | Roberge | 482/62 |
| 5,104,120 | 4/1992 | Wetterson et al. . | |

FOREIGN PATENT DOCUMENTS 2558064 6/1985 France .

*Primary Examiner*—Stephen R. Crow
*Attorney, Agent, or Firm*—Richard C. Litman

[57] ABSTRACT

An exercise machine with a seat and two adjustable cranking mechanisms is disclosed. The first cranking mechanism has rotatable hand grips for grasping by the user's hands while the second cranking mechanism has rotatable pedals for engagement by the user's feet. This second cranking mechanism is located at a position vertically above the location of the seat. Therefore, the exerciser may not use his or her body weight when exerting pressure on the pedals. This machine exercises virtually all of a user's muscle groups, however, the configuration of the seat vertically below the second crank mechanism results in a particularly strenuous activity for a user's hamstrings. Additionally, each cranking mechanism is selectively adjustable to a plurality of exercise positions. This makes the machine adaptable to all exercisers regardless of their size and shape and permits the user to selectively vary the exertion required during the exercise.

18 Claims, 2 Drawing Sheets

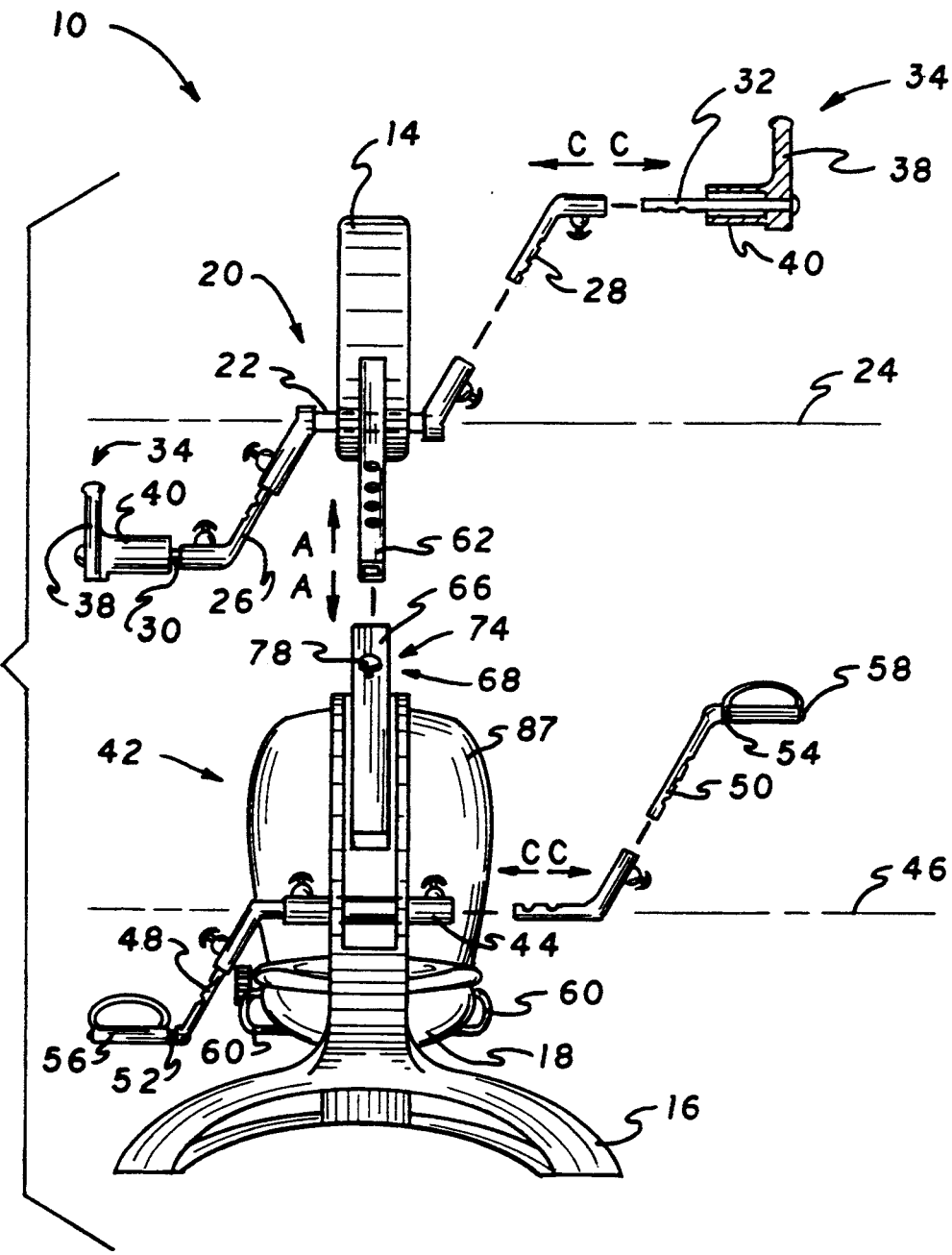

EXERCISE MACHINE

BACKGROUND OF THE INVENTION

1. Field of the Invention

The present invention relates to an exercise machine having rotatable hand and foot cranking mechanisms. More specifically, the invention discloses an exercise machine having rotatable hand and foot cranking mechanisms which includes a plurality of adjustable components to make the machine suitable for all users, regardless of their size and strength.

2. Description of the Prior Art

| PRIOR ART OF INTEREST | | |
|---|---|---|
| Number | Inventor | Issue Date |
| 3,213,852 | Lawson J. Zent | Oct. 26, 1965 |
| 3,964,742 | Guido Carnielli | June 22, 1976 |
| 4,402,502 | Gilbert E. Peters | Sep. 6, 1983 |
| 4,423,863 | Romulo A. Figueroa | Jan. 3, 1984 |
| 4,842,269 | Gwo-Ming Huang | June 27, 1989 |
| 5,104,120 | Scott E. Watterson et al. | Apr. 14, 1992 |
| D 191,792 | James Maratta | Nov. 21, 1961 |
| D 305,347 | Steve Wittenbrock et al. | Jan. 2, 1990 |
| French 2 558 064 | Andre Lechtzier | June 19, 1985 |

Exercise machines wherein both the arms and legs of a user produce a cycling movement about a crank shaft have been well known in the prior art. These machines allow the user to simultaneously exercise his or her upper and lower body. Important to the design of these machines is the ability to accommodate people of all sizes and strengths. Therefore, most, if not all, of these exercise machines include mechanisms allowing each user to manually adjust components of the machine to meet his or her particular needs. These adjustments usually concern either the height of the rotatable crank shafts in relation to the user or the distance of the rotatable crank shaft away from the user.

The prior art discloses many exercise machines with adjustable components. One such component is commonly an adjustable seat. Examples of machines allowing this type of adjustment are seen in the Zent patent and the Wittenbrock et al. patent. The Zent patent incorporates a stem attached to a seat or saddle. This stem has a telescoping arrangement with a tubular member, wherein the stem is slidably positioned within the tubular member thus allowing the seat to be raised or lowered. A bolt is used to lock the stem in the desired position. The Wittenbrock et al. patent includes a seat movable in the horizontal direction as it is selectively positioned along the length of a substantially horizontal runner.

Another exercise machine with a plurality of adjustable components is shown in the Carnielli patent. This patent includes seat and handle systems independently adjustable in both the vertical and horizontal directions with respect to the crank pedal system. The vertical movement of both the seat and the handle system of this invention incorporates a mechanism similar to that of the Zent patent. Both are movable by the use of telescoping posts. The horizontal movement of the seat employs an arrangement similar to that shown in the Wittenbrock et al. patent, as it is adjustably positioned along the length of a horizontal runner. The horizontal movement of the handle system is accomplished by a tubular member hingedly secured to a stationary member. A screw clamp is provided to secure the tubular member to the stationary member at the desired position.

Other inventions employing the use of a plurality of adjustable components can be seen in the Huang patent and the Lechtzier patent document. As with the Carnielli and Zent patents, both of these inventions utilize telescoping members to permit the movement of their seats and handle mechanisms.

An exercise machine which is sufficiently adjustable along the axis of the crank shafts, so as to span a greater width, is not shown in the prior art. Nor is there an exercise machine which permits the user to quickly and easily modify the radius of rotation of both the hand grips and foot pedals about their respective crank shafts. Such adjustments are topics of this invention and their advantage is in creating universality in the exercise machine to accommodate any user, regardless of his or her size and strength.

None of the above inventions and patents, taken either singly or in combination, is seen to describe the instant invention as claimed.

SUMMARY OF THE INVENTION

The present invention is an exercise machine with two adjustable cranking mechanisms and a seat. The first cranking mechanism has rotatable grips for grasping by the user's hands while the second cranking mechanism has rotatable pedals for engagement by the user's feet. This second cranking mechanism is located at a position vertically above the location of the seat. Therefore, the exerciser may not use his or her body weight when exerting pressure on the pedals. This machine exercises virtually all of a user's muscle groups, however, the configuration of the seat vertically below the second crank mechanism results in a particularly strenuous activity for a user's hamstrings. Additionally, each cranking mechanism is selectively adjustable to a plurality of exercise positions. This makes the machine adaptable to all exercisers, regardless of their size and shape. Additionally, each modification in the configuration of the exercise machine correspondingly changes the required exertion required to conduct the exercise.

Accordingly, it is a principal object of the invention to provide an exercise machine which may be properly and comfortably used by people of all sizes and shapes.

It is another object of the invention to provide an exercise machine capable of being selectively adjusted to vary the level of exertion required during exercise.

It is another object of the invention to provide an exercise machine configured to particularly strengthen a user's hamstrings.

It is a further object of the invention to provide an exercise machine having two axially adjustable crank mechanisms.

Still another object of the invention is to provide an exercise machine having two crank mechanisms, each with a selectively adjustable radius of rotation.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 2 is a front elevational view of the exercise machine of FIG. 1.

Similar reference characters denote corresponding features consistently throughout the attached drawings.

DETAILED DESCRIPTION OF THE PREFERRED EMBODIMENT

Figure 1:
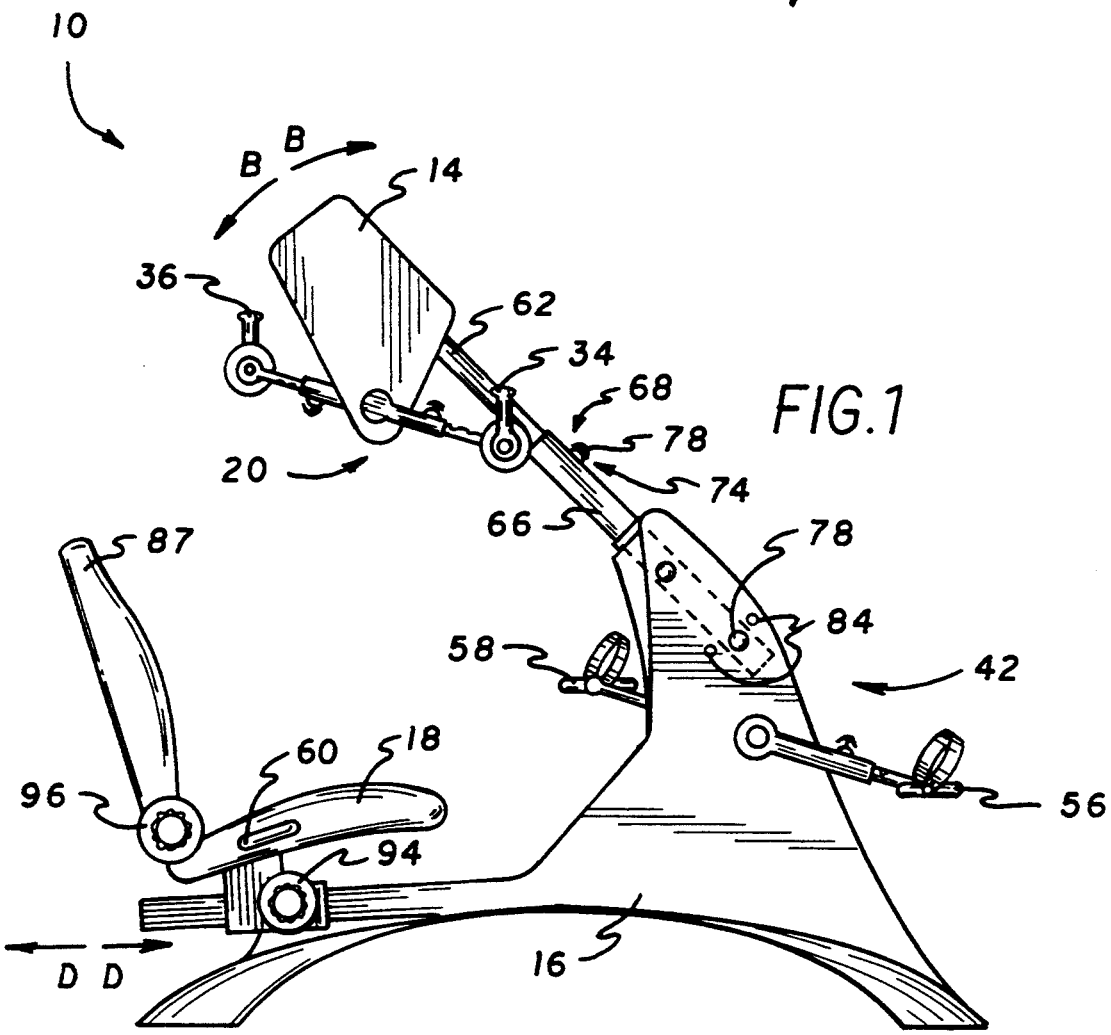
FIG. 1 is a side elevational view of the exercise machine of the present invention.

Referring now to the drawings, FIGS. 1 and 2 illustrate an exercise apparatus 10 having a body with an upper portion 14 and a lower portion 16. A seat 18 is attached to the lower portion 16. A first crank mechanism 20 is rotatably attached to the upper portion 14 of body. As detailed in FIG. 2, this first crank mechanism 20 includes a first rotatable main shaft 22 which rotates about a first horizontal axis of rotation 24. Extending from the first rotatable main shaft 22 is a first pair of moment arms 26,28. Each of these first pair of moment arms 26,28, is attached to one end of the first rotatable main shaft 22. Additionally, each moment arm 26 or 28 is also connected to one throw of a first pair of throws 30,32. Each throw 30,32, is equipped with an L-shaped hand grip 34 or 36, which moves orbitally with respect to its throw 30 or 32. The L-shaped configuration of hand grips 34,36 allows the user to hold these hand grips 34,36 at two positions 38,40.

A second crank mechanism 42 is rotatably attached to the lower portion 16 of the body. This crank mechanism 42 includes similar components to the first crank mechanism 20. It has a second rotatable main shaft 44 which rotates about a second horizontal axis of rotation 46. There is a second pair of moment arms 48,50, extending from the second rotatable main shaft 44 and a second pair of throws 52,54 extending from the moment arms 48,50 respectively. Each throw 52 or 54 includes a pedal 56,58 for engagement by one of the exerciser's feet. Each pedal 56 or 58 moves orbitally with respect to its corresponding throw 52 or 54.

The second rotatable main shaft 44 is located vertically above the seat 18. This places the feet of the exerciser vertically above the approximate center of the exerciser's body weight. Therefore, the exerciser cannot utilize his or her body weight when exerting pressure on the pedals, 56,58. This configuration greatly extends the user's hamstrings and correspondingly produces a particularly strenuous exercise for these muscles. As seen in FIG. 1, there is a handle 60 attached to the seat 18 if the exerciser should desire to grip a stationary member as opposed to gripping the first crank mechanism 20.

One of the main features of the present invention concerns the flexibility of the exercise apparatus 10 to accommodate a multiplicity of users and allow for a variety of exercise positions. A plurality of components of the machine are independently adjustable, therefore permitting the user to tailor the configuration of the machine to his or her specific needs.

Figure 3:
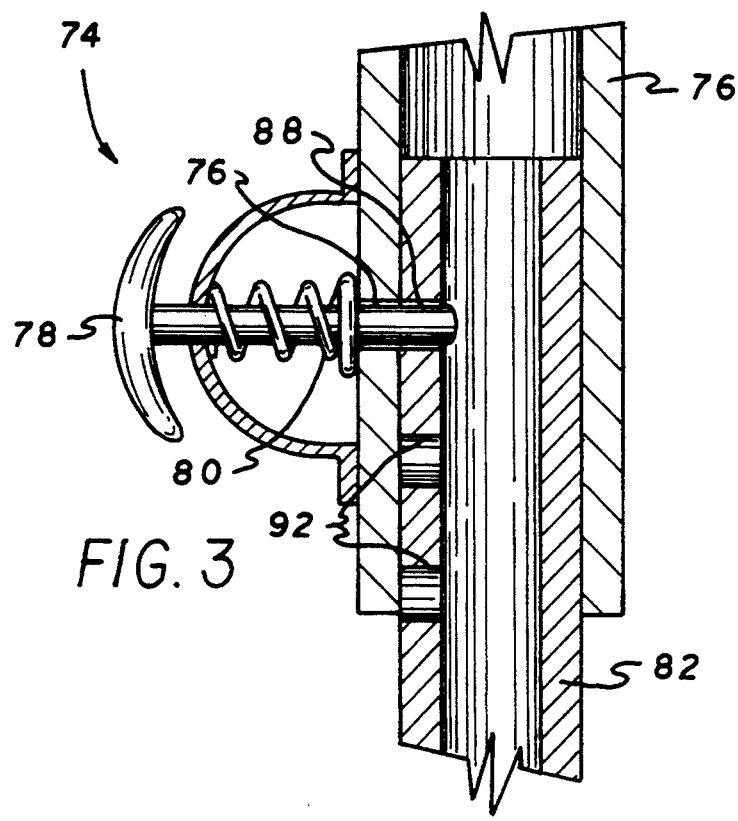
FIG. 3 is an enlarged side elevational detail view of the pin mechanism of the exercise machine of FIG. 1.

As can be seen in FIGS. 1 and 2, the preferred embodiment of the invention includes means for selectively varying the distance between the upper portion 14 and lower portions 16 of the body. The upper portion 14 of the body may be moved in the direction of line A—A and includes an elongated member 62. This elongated member 62 has a telescoping relationship with a corresponding elongated member 66 which extends from the lower portion 16. There is a pin mechanism 74 to prevent relative movement of telescoping members 62 and 66. This pin mechanism 74 is utilized throughout this invention and is generally depicted in FIG. 3.

This pin mechanism 74 is attached to the outer telescoping member 76 and includes a spring loaded pin 78. When the spring 80 is at rest, the pin 78 protrudes through the aligned holes 88,90 of each telescoping member 76,82. The pin 78 may be manually withdrawn from the aligned holes 88,90, thus leaving the telescoping members 76,82 free to slide relative to each other, so that hole 90 may be aligned with a different hole 92 to receive pin 78.

The ability to adjust the height of the first crank mechanism 20 allows the user to vary the exertion required to conduct the exercise. When the user is relatively new to exercises of this type, he or she can keep the first crank mechanism 20 at a vertical level equivalent to the approximate vertical level of his or her heart. As commonly known in the field of physiology, each incremental increase in the height of the first crank mechanism 20 above the heart corresponds to an increase in the difficulty of the exercise. Therefore, as stamina and strength improve, the user can increase the height of the first crank mechanism 20.

Additional flexibility in the positioning of the upper portion 14 relative to the lower portion 16 is obtained by the pivotal attachment of the elongated member 66 to the lower portion 16. As depicted in FIG. 1, this attachment allows the upper portion 14 to move along arc B—B. This elongated member 66 includes a hole 68 therethrough alignable with a plurality of holes 84 in the lower portion 16 of the body. A pin mechanism 74, as described above, is attached to the lower portion 16 of the body and secures the movement of the elongated member 66 relative to the lower portion 16.

The exercise apparatus 10 also includes means to adjust the length of each moment arm 26,28,48 or 50. As depicted in FIG. 2, the moment arms 26,28,48,50 of the preferred embodiment of the invention are angled at approximately 45 degrees from the vertical direction. Therefore, adjusting the length of any moment arm 26,28,48, or 50 affects the arrangement of the exercise apparatus in two manners. First, there is a change in the radius of rotation of each adjusted moment arm 26,28,48 or 50 about its respective rotatable main shaft 22 or 44. Second, depending upon which moment arm 26,28,48 or 50 is to be adjusted, the user can vary either the horizontal distance between the hand grips 34,36 or the horizontal distance between the pedals 56,58.

Of course, the angle of the moment arms 26,28,48,50 with respect to the vertical direction could be modified during manufacture. If the moment arms 26,28,48,50 were substantially vertical, changing the length of a moment arm 26,28,48,50 would affect the respective radius of rotation without altering the distance between either the grips 34,36 or the pedals 56,58.

The method employed to change the length of each moment arm 26,28,48,50 is similar to the method described above for altering the distance between the upper portion 14 and the lower portion 16. This method is depicted generally in FIG. 3. Each moment arm 26,28,48,50 includes two telescoping members 76,82. One of these telescoping members 82 has a plurality of holes 92 therethrough while the other telescoping member 76 has one hole 90 and a pin mechanism 74. Hole 90 aligns with one of holes 92 to receive a pin 78 which secures the relative movement of the telescoping members 76,82.

Additionally included in the present invention are means for axially adjusting both the first crank mechanism 20 and second crank mechanism 42. This axial adjustment is along the direction of line C—C and either increases or decreases the distance between each pedal 56,58 and/or each hand grip 36,38. The axial adjustment of the first crank mechanism 20 is accomplished by varying the length of each of the first pair of throws 30,32 while the axial adjustment of the second crank mechanism 42 is obtained by varying the length of the second rotatable main shaft 44. As the forces resulting from a user's legs are usually substantially higher than those forces resulting from the user's arms, the axial adjustment of the second crank mechanism 43 should be along its strongest component. Therefore, the second rotatable main shaft 44, which has a greater diameter and strength than the throws 52,54, was chosen to include the means for axially adjusting the second crank mechanism 42. As shown in FIG. 2, both the axial adjustment of the first pair of throws 30,32 and the axial adjustment of the second rotatable main shaft 44 are accomplished with the pin mechanism 74 and telescoping members of FIG. 3. As pointed out in FIG. 2, the second rotatable main shaft 44 comprises three members; one central member, and two outer members each having a telescoping relationship with a different end of the central member.

One final adjustable component of the present invention is the seat 18, which is selectively positioned along the length of a horizontal runner 86 using screw clamp 94. The seat is also provided with an adjustable back portion 87. The adjustment of this back portion 87 is along arc D—D and is secured at a desired location by screw clamp 96.

It is to be understood that the present invention is not limited to the sole embodiment described above, but encompasses any and all embodiments within the scope of the following claims.

I claim:

1. An exercise apparatus comprising:
   a body having an upper portion and a lower portion joined to said upper portion;
   a first crank mechanism rotatably attached to said upper portion, said first crank mechanism having a first rotatable main shaft defining a first horizontal axis of rotation and a first pair of moment arms each attached to opposite ends of said first rotatable main shaft, said first pair of moment arms having a first pair of throws, each one of said first pair of throws being attached to one of said first pair of moment arms; and
   a second crank mechanism rotatably attached to said lower portion, said second crank having a second rotatable main shaft defining a second horizontal axis of rotation and a second pair of moment arms attached to opposite ends of said second rotatable main shaft, said second pair of moment arms having a second pair of throws, each one of said second pair of throws being attached to one of said second pair of moment arms;
   said second horizontal axis of rotation being located vertically above said seat;
   at least one of said first and second crank mechanisms having means for adjusting the length of a said respective rotatable main shaft for providing axial adjustment.

2. The exercise apparatus according to claim 1, further comprising a seat slidably attached to said lower portion along a horizontal direction, said seat also having an adjustable seat back.

3. The exercise apparatus according to claim 1, further including means for pivotally connecting said upper portion to said lower portion.

4. The exercise apparatus according to claim 1, further including means for selectively varying the distance between said upper portion and said lower portion.

5. The exercise apparatus according to claim 4, wherein said means for selectively varying the distance between said upper portion and said lower portion comprise two telescoping members, one of said two telescoping members being attached to said upper portion, the other one of said two telescoping members being attached to said lower portion;
   at least one of said two telescoping members having means defining a plurality of holes therein;
   the other of said two telescoping members having means defining at least one opening therein, each one of said plurality of holes being alignable with each one of said at least one opening;
   there also being a pin insertable into any one of said plurality of holes and into any one of said at least one opening, whereby the distance between said upper portion and said lower portion may be selectively varied.

6. The exercise apparatus according to claim 2, wherein said seat further includes a handle.

7. The exercise apparatus according to claim 1, further including means for adjusting the length of at least any one moment arm of said first and second pairs of moment arms.

8. The exercise apparatus according to claim 7, said means for adjusting the length of at least any one moment arm comprising an arrangement wherein each adjustable moment arm of said first and second pairs of moment arms comprises two telescoping members;
   at least one of each said pair of telescoping members having means defining a plurality of holes therein;
   the other of each said pair of telescoping members having means defining at least one opening therein, each one of said plurality of holes being alignable with each one of said at least one opening;
   there also being a pin insertable into any one of said plurality of holes and into any one of said at least one opening, whereby each one of said at least any one moment arms is adjustably secured at a desired length, effort of rotating said first and second crank mechanisms thus being adjustable.

9. The exercise apparatus according to claim 1, wherein said means providing axial adjustment of at least one of said first and second crank mechanisms comprise means for adjusting the length of at least one throw of said first and second pairs of throws.

10. The exercise apparatus according to claim 9, said means for adjusting the length of at least one throw comprising an arrangement wherein said at least one throw comprises two telescoping members;
   at least one of each said pair of telescoping members having means defining a plurality of holes therein;
   the other of each said pair of telescoping members having means defining at least one opening therein, each one of said plurality of holes being alignable with each one of said at least one opening;

there also being a pin insertable into any one of said plurality of holes and into any one of said at least one opening, thereby permitting said at least one throw to be adjustably secured at a desired length;

each throw of said first pair of throws having a hand grip for grasping by hand, each said hand grip being arranged to move orbitally with respect to said throw;

each throw of said second pair of throws having a pedal for foot engagement, each said pedal being arranged to move orbitally with respect to said throw.

11. The exercise apparatus according to claim 1, said means for adjusting the length of at least one rotatable main shaft comprising an arrangement wherein said at least one rotatable main shaft comprises at least two telescoping members;

at least one of each said pair of telescoping members having means defining a plurality of holes therein;

the other of each said pair of telescoping members having means defining at least one opening therein, each one of said plurality of holes being alignable with each one of said at least one opening;

there also being a pin insertable into any one of said plurality of holes and into any one of said at least one opening, thereby permitting said at least one rotatable main shaft to be adjustably secured at a desired length.

12. An exercise apparatus comprising:

a body having an upper portion and a lower portion pivotally joined to said upper portion;

means for selectively varying the distance between said upper portion and said lower portion;

a seat slidably attached to said lower portion along a horizontal direction, said seat having a seat back;

a first crank mechanism rotatably attached to said upper portion, said first crank mechanism having a first rotatable main shaft defining a first horizontal axis of rotation, and a first pair of moment arms each attached to opposite ends of said first rotatable main shaft, and a first pair of throws, each one of said first pair of throws being attached to one of said first pair of moment arms;

a second crank mechanism rotatably attached to said lower portion, said second crank having a second rotatable main shaft defining a second horizontal axis of rotation, and a second pair of moment arms attached to opposite ends of said second rotatable main shaft, and a second pair of throws, each one of said second pair of throws being attached to one of said second pair of moment arms, said second horizontal axis of rotation being located vertically above said seat; and means for adjusting the length of at least any one moment arm of said first and second moment arms;

each of said first and second crank mechanisms having means for adjusting the length of a said respective rotatable main shaft for providing axial adjustment.

13. The exercise apparatus according to claim 12, wherein said means for selectively varying the distance between said upper portion and said lower portion comprises two telescoping members, one of said two telescoping members being attached to said upper portion, the other one of said two telescoping members being attached to said lower portion;

at least one of said two telescoping members having means defining a plurality of holes therein;

the other of said two telescoping members having means defining at least one opening therein, each one of said plurality of holes being alignable with each one of said at least one opening;

there also being a pin insertable into any one of said plurality of holes and into any one of said at least one opening, whereby the distance between said upper portion and said lower portion may be selectively varied.

14. The exercise apparatus according to claim 13, wherein said one of said two telescoping members attached to said lower portion further comprises a handle.

15. The exercise apparatus according to claim 12, said means for adjusting the length of at least any one moment arm comprising an arrangement wherein each adjustable moment arm of said first and second pairs of moment arms comprises two telescoping members;

at least one of each said pair of telescoping members having means defining a plurality of holes therein;

the other of each said pair of telescoping members having means defining at least one opening therein, each one of said plurality of holes being alignable with each one of said at least one opening;

there also being a pin insertable into any one of said plurality of holes and into any one of said at least one opening, whereby each one of said at least any one moment arms is adjustably secured at a desired length, effort of rotating said first and second crank mechanisms thus being adjustable.

16. The exercise apparatus according to claim 12, wherein said means providing axial adjustment of said first crank mechanism comprise means for adjusting the length of at least one throw of said first pair of throws.

17. The exercise apparatus according to claim 16, said means for adjusting the length of at least one throw comprising an arrangement wherein said at least one throw comprises two telescoping members;

at least one of each said pair of telescoping members having means defining a plurality of holes therein;

the other of each said pair of telescoping members having means defining at least one opening therein, each one of said plurality of holes being alignable with each one of said at least one opening;

there also being a pin insertable into any one of said plurality of holes and into any one of said at least one opening, thereby permitting said at least one throw to be adjustably secured at a desired length;

each throw of said first pair of throws having a hand grip for grasping by hand, each said hand grip being orbital with respect to said throw;

each throw of said second pair of throws having a pedal for foot engagement, each said pedal arranged to move orbitally with respect to said throw.

18. The exercise apparatus according to claim 12, said means for adjusting the length of said second rotatable main shaft comprising an arrangement wherein said second rotatable main shaft comprises two outer members and one central member, said two outer members each having a telescoping arrangement with a different end of said central member, at least one of each said telescoping members having means defining a plurality of holes therein;

the other of each said telescoping members having means defining at least one opening therein, each one of said plurality of holes being alignable with each one of said at least one opening;

there also being a pin insertable into any one of said plurality of holes and into any one of said at least one opening, thereby permitting said at least one rotatable main shaft to be adjustably secured at a desired length.

* * * * *